April 16, 1957     F. A. LINDLEY     2,788,588
LAND MASS TRAINER

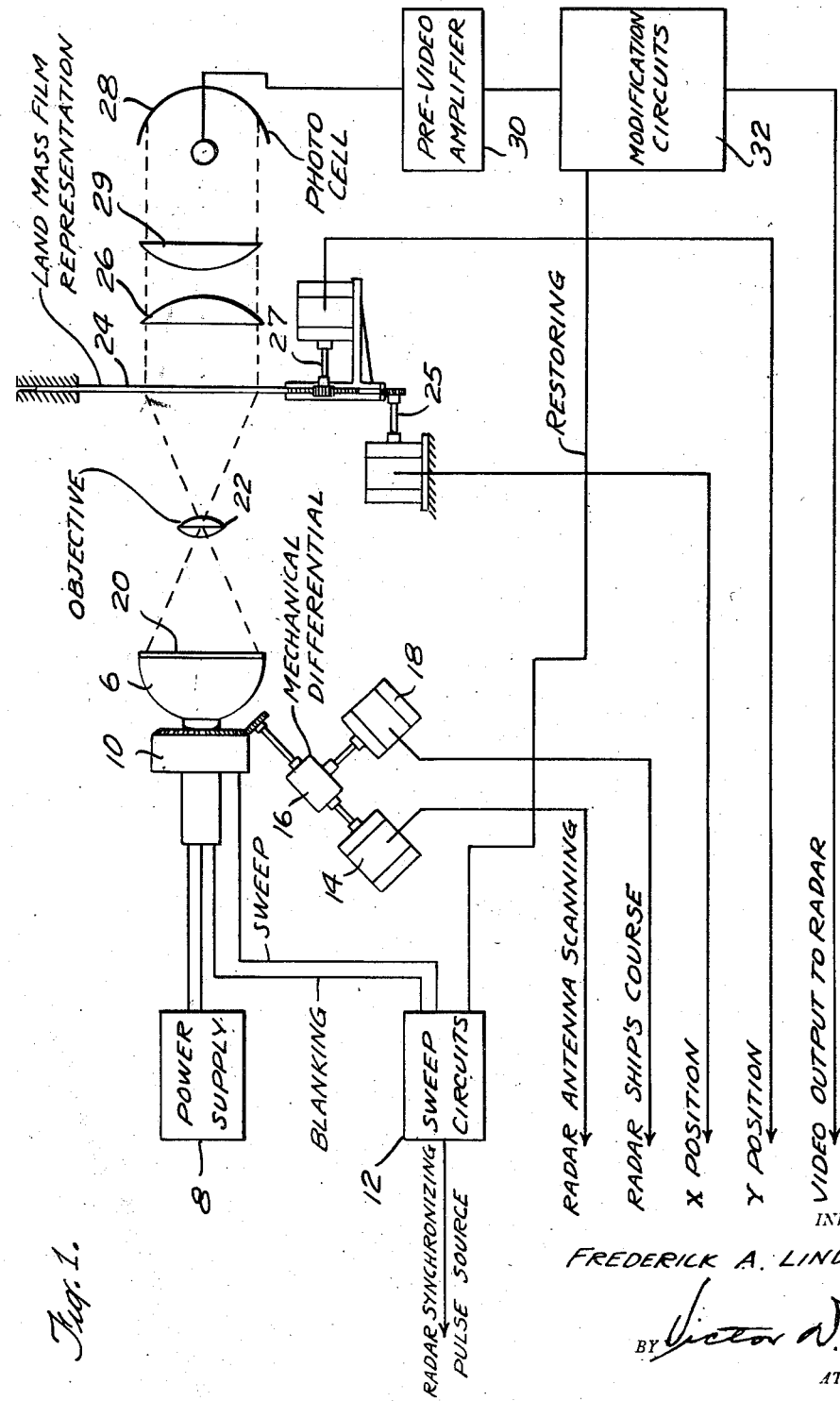

Filed Nov. 17, 1953     2 Sheets-Sheet 2

INVENTOR.
FREDERICK A. LINDLEY
BY *Victor D. Borst*
ATTORNEY

United States Patent Office 2,788,588
Patented Apr. 16, 1957

2,788,588

LAND MASS TRAINER

Frederick A. Lindley, Flushing, N. Y., assignor to Smith-Meeker Engineering Co., New York, N. Y., a corporation of New York Application November 17, 1953, Serial No. 392,625

5 Claims. (Cl. 35—10.4)

This invention relates to a trainer which can be adapted to standard radar equipment for artificially exciting the receiver and indicator elements thereof in accordance with terrain elevations of known land masses.

Various methods of simulating radar presentations of land mass and terrain areas have been developed. Their purpose was to obtain a sufficient degree of realism and flexibility so that adequate training might be achieved with respect to the appearance of land masses on radar scopes.

Of the various methods employed all contain certain limitations or objections. The liquid tank simulator based on the ultra sonic principle suffers from bulkiness, complication and inflexibility as to area scale as well as more or less limited area of operation. In order to overcome some of these limitations and defects an optical type of simulator was developed. It employed a television viewing principle and a flexible relief map. This approach solved the scale problem and limitation of area but it still retained the objections of bulkiness and complication.

One of the problems encountered in efforts to achieve realism of the simulated presentation was the changing radar scope aspect of the terrain due to elevations of the terrain and the height and position of the radar above the terrain. This change of radar aspect resulting from changes in altitude and position with respect to a given land mass area was an important feature that these methods achieved and also largely accounted for their complexity.

Another approach was developed which employed what is known as the flying spot method of scanning. This method offered great simplification and size reduction over the previous methods. It also retained the scale flexibility and other advantages but had the important defect of lacking the aspect change of the land masses due to position changes. The compactness and desirability of the method however led to its use even though it lacked an important degree of realism in this respect.

It is the purpose of this invention to add to the flying spot type of simulator the change of aspect of terrain elevations due to radar position and altitude variations. In accomplishing this it adds to the flying spot method of land mass simulation the important missing feature achieved laboriously by the previous methods. At the same time it retains all the other desirable characteristics of the flying spot method.

This invention contemplates a flying spot type of trainer, simulating a land mass radar presentation as might be displayed on a PPI scope of a radar. It employs a flying spot type of cathode ray tube in conjunction with a deflection yoke rotating the produced sweep of the beam in asynchronism with the radar antenna. The moving spot of light, produced on the face of the cathode ray tube by the sweeping cathode ray beam, is transmitted to a photocell through a specially prepared film after being focused by a lens on the plane of the film. Land mass areas are represented on the film by areas of differing degrees of transparencies depending upon elevation. Contour transitions are smooth and uniform from one adjacent area to another. As the sweep traverses an area along a scan line the amount of transmitted light is therefore a function of elevation. The photocell converts this to an electrical signal and thus the signal voltage is a function of elevation.

This signal voltage is amplified and supplied as a large voltage to the grid of a vacuum tube. The grid circuit is arranged with a relatively high resistance grid leak so that the grid bias developed follows proportionately the amplified signal voltage. The polarity of the signal is arranged so that higher elevations represent a change of the signal in the positive direction. Thus the bias developed by the signal is related to the increasing elevation of the terrain. Relatively long time constants are provided in the grid circuit to cause the bias to persist and prevent the passing of a subsequent signal unless its voltage is high enough to overcome the bias previously developed. Such subsequent voltage would represent a still higher point of elevation. Voltages representing lower elevations cannot pass through the tube since they cannot overcome the persisting cut-off grid bias. Such elevations would not be observable in the simulated radar presentation and would correspond to the real situation where the same effect would occur because of the presence of higher terrain elevations nearer the radar. This elimination of land elevations lower than elevations closer to the observer is known as a shadowing effect. The effect is attained simply and without cumbersome and costly equipment.

The biasing of the tube may be purposefully leaked off or dropped at a controlled rate during the scan time. This would permit smaller voltages representing lesser elevations to show up in the tube output, thus corresponding to slant range aspect as would be the case were the radar antenna conveyed by airplane which was itself changing altitude. At the end of the scan time a restoring circuit would return the voltage to a proper reference position so that the process can be repeated for the succeeding scan.

These features are illustrated by a practical embodiment of the invention as shown in the accompanying drawings and described with respect thereto in the following specification:

Fig. 1 is a schematic diagram of the trainer system;

Figs. 2b and 2c are graphs showing the relation between input voltage B and output voltage C in the modification circuit.

Figure 2A:
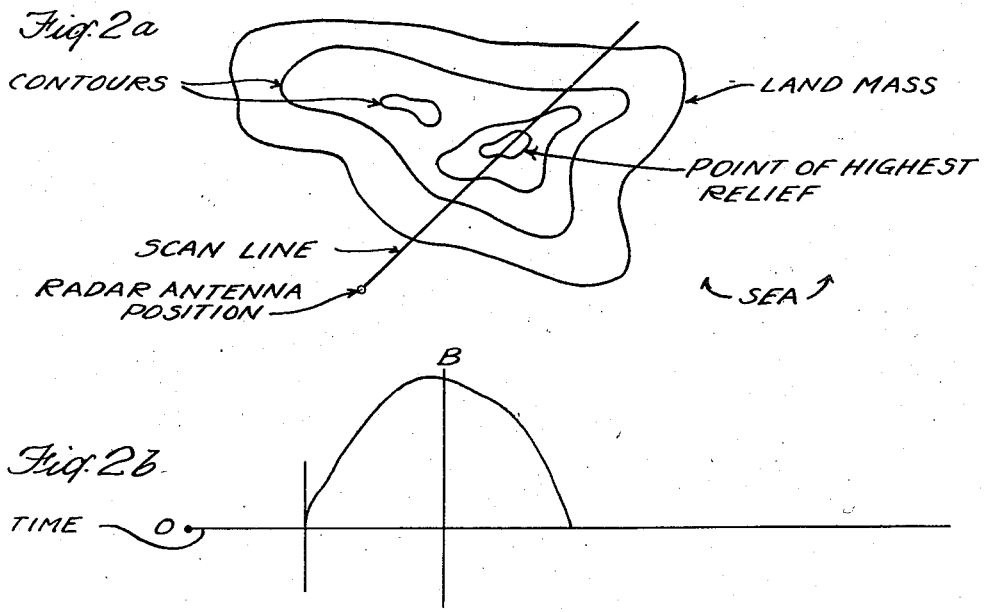
Fig. 2a is a contour map as might appear on the trainer film and a scan line.

One of the important elements of the radar trainer is a 5WP15 flying spot scanning cathode ray tube tube 6 powered by a power source 8 and having a PPI type revolving deflection yoke 10 mounted on its neck. The synchronizing signal for the sweep is supplied by the timing circuits of the radar to which the trainer is adapted. Sweep circuits 12 provide the deflection currents for the deflection yoke 10. The deflection yoke 10 revolves as a function of the radar antenna in proper asynchronism by means of servo 14 and differential 16, the output shaft of which engages the yoke 10. Servo 18 may also be provided to introduce plane's course information into differential 16 in order to provide the presentation in relative bearing.

A transparent plate 20 with appropriately engraved radial grooves is mounted closely and concentrically with the face of the tube. This gives the smear effect due to antenna beam width.

An objective lens 22 is placed axially in front of the cathode ray tube for focusing the beam at the plane of land mass film 24. The position of the film is adjustable in its plane with respect to the cathode ray tube. This simulates the movement of the radar with respect to the terrain as would be the case if the radar were mounted in a moving airplane or ship. Mechanical positioning means along a horizontal ($x$) axis and vertical ($y$) axis are provided by shafts 25 and 27 respectively and film engaging rack and pinion means. This film is a photographic film representing the land mass of the target area and is of various degrees of transparency in accordance with the elevations of the land masses represented thereon. The film may be a transparency and have the light transmitted through it, which is the form shown, or it may be an opaque print and have the light reflected from its surface.

Lenses 26 and 29 bring the transmitted light to bear on a light-sensitive cell or photocell 28, the three units being positioned on the side of the film 24 opposite the cathode ray tube.

Amplifier 30 is electrically connected to the photocell 28. The voltage generated by the photocell and amplified by the amplifier 30 is a function of the intensity of light transmitted by the film over a scan line and because of the nature and character of the film is also a function of land mass altitude, inasmuch as the light values falling on the photocell have been altered by the film to correspond with terrain elevations. The amplification is effected with maximum linearity so that the range of video intensity is not appreciably distorted. The output of the amplifier is also at relatively low impedance.

Figure 3:
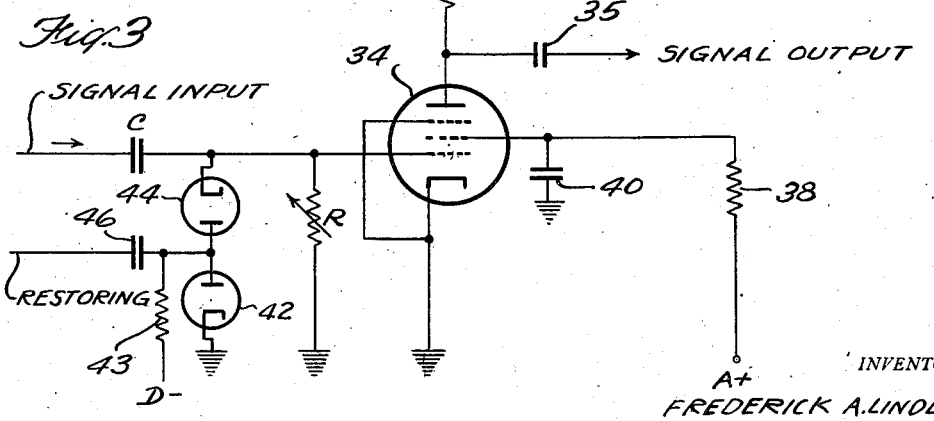
Fig. 3 is a typical modification circuit for processing the video signal.

The output of amplifier 30 is introduced by electrical connection into modification circuit box 32 where the signal is processed to achieve the desired shadowing effect. One method of achieving this effect is shown in Fig. 3.

Figure 2B:
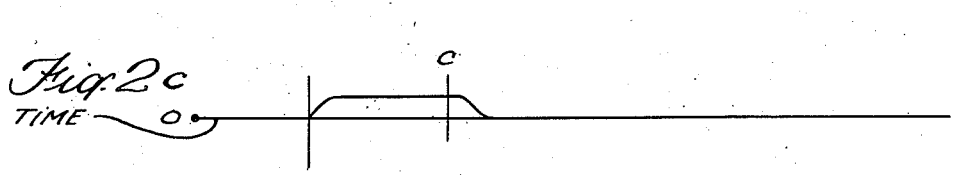

The signal output of amplifier 30 as shown by Fig. 2b is introduced into the grid of tube 34 through the coupling capacitor C. As the signal rises in the positive direction corresponding to an increasing elevation, it causes the grid to become conducting and the resulting grid current charges the coupling capacitor C. The resulting voltage charge on capacitor C depends upon the positive signal rise and thus is proportional to it. The grid resistor R is of a relatively high value so that when the signal voltage recedes, the bias charge developed on capacitor C holds and prevents the tube 34 from conducting and thus passing the signal to its output. Fig. 2c shows the corresponding output voltage. Thus a subsequent signal will not be passed unless it has a sufficiently high positive voltage to overcome the negative bias developed by the preceding positive signal. This higher voltage then would correspond to a terrain elevation higher than the preceding one unless the bias charge developed on capacitor C was reduced by leaking off through grid resistor R. By altering the value of grid resistor R the rate at which the bias is leaked off can be controlled and the voltage or elevation that will subsequently cause conduction in tube 34, and thus show in the output, is altered accordingly. If the subsequent rise in voltage occurs at a greater interval of time the bias voltage will have leaked down to a lower value and a correspondingly lesser voltage will be required to cause conduction. This corresponds to a conditon where the radar, being air-borne and above the terrain elevations, can see over foreground elevations and observe lesser ones beyond. By controlling the value of grid resistor R the conditons corresponding to various radar altitude positions can be simulated. At the end of the scan line it is necessary to restore the voltage conditions in the grid circuit of tube 34 so that subsequent scans will not be affected. Each scan is controlled only by its own conditions. This is accomplished by the clamping reference circuit comprising two diode tubes 44 and 42, coupling capacitor 46 and resistor 43 which connects to a source of D. C. negative voltage D. The action of the clamp circuit is explained as follows:

The negative voltage D is sufficient to prevent either diode 44 or 42 from conducting anytime during the scan or active signal time. At any suitable reference time a positive clamp pulse in synchronism with the scanning system is applied through the coupling capacitor 46 to the plates of diodes 44 and 42. This is shown by the connection between the sweep circuits 12 and the modification circuits 32 marked restoring. This clamp pulse can occur during the blanking interval for example, the amplitude of this clamp pulse is sufficient to overcome the negative bias D and cause the diodes 44 and 42 to conduct. Diode 42 has its cathode connected to ground and thus limits the clamping pulse to this reference voltage. Since diode 44 also will conduct, a voltage reference to ground for the grid circuit of tube 34 will be established. This restores the conditons for the next subsequent scan where the previously described conditons will occur.

The plate circuit of tube 34 is connected to the radar receiver and indicator through capacitor 35 where the simulated relief presentation ocurs.

As shown in Fig. 3 tube 34 is a pentode having a screen grid between the control grid and plate to reduce direct capacitance between these elements and therefore the tendency toward feed-back at high frequencies. A positive potential is placed on the screen grid through resistor 38 by voltage source A. A larger voltage is placed on the plate through resistor 36 by voltage source B. Fixed capacitor 40 by-passes the screen grid in order that it is effectively grounded for high frequency currents. A suppressor grid between the screen grid and the plate is connected to the cathode in order that a negative charge relative to the plate may be placed thereon for controlling secondary emission in the usual manner. These are generally used expedients for improving circuit performance.

The expedient described above for processing the converted video signal to produce the desired shadowing effect is intended for illustrative purposes only and the invented system is not to be restricted thereto. Departures from the embodiment as shown may be made without departing from the principles of invention as defined in the following claims.

What is claimed is:

1. A radar trainer comprising a photocell, a flying spot scanner arranged to project a beam on said cell, radar synchronizing means connected to the flying spot scanner means for altering the light value of the projected beam to correspond with the elevations of a known land mass, an amplifier connected to the output of said photocell, a circuit connected to said amplifier, said circuit having means for generating a biasing or cut-off voltage in accordance with the rise in the amplified output voltage of said photocell and for controling the rate of fall of said biasing or cut-off voltage and means for employing said biasing or cut-off voltage to block the output of said circuit when the amplified output voltage of the photocell is below the level of the biasing or cut-off voltage as a consequence of the rate of fall of said amplified output voltage exceeding the controlled rate of all of said cut-off voltage.

2. A radar trainer comprising a photocell, a flying spot scanner arranged to project a beam on said cell radar synchronizing means connected to the flying spot scanner, means for altering the light value of the projected beam to correspond with the elevations of a known land mass, an amplifier connected to the output of said photocell, a modification circuit including a vacuum tube having a grid circuit connected to said amplifier, said grid circuit having a condenser and a high value grid leak resistance, the time constants for said condenser and resistance being sufficiently long to insure persistance of voltages developed in said grid circuit during a scanning interval of the flying spot scanner beam and means for restoring said vacuum tube to initial voltage conditions between scanning intervals.

3. A radar trainer as defined in claim 2 wherein the means for altering the light value of the projected beam comprises a land mass film, the land masses on which are represented by areas of differing relative transparency dependent upon terrain elevation.

4. A land mass trainer as defined in claim 2 wherein the said grid leak resistance and condenser is variable in order to produce effects of changing altitude.

5. A radar trainer as claimed in claim 2 wherein a clamping reference circuit is connected to said vacuum tube and a source of negative voltage and means are provided for applying between scanning intervals a positive clamp pulse to said clamping circuit larger than said negative voltage whereby said tube is restored to initial voltage conditions.

References Cited in the file of this patent
UNITED STATES PATENTS 2,652,636   Garman et al. _____ Sept. 22, 1953